Figure 1:
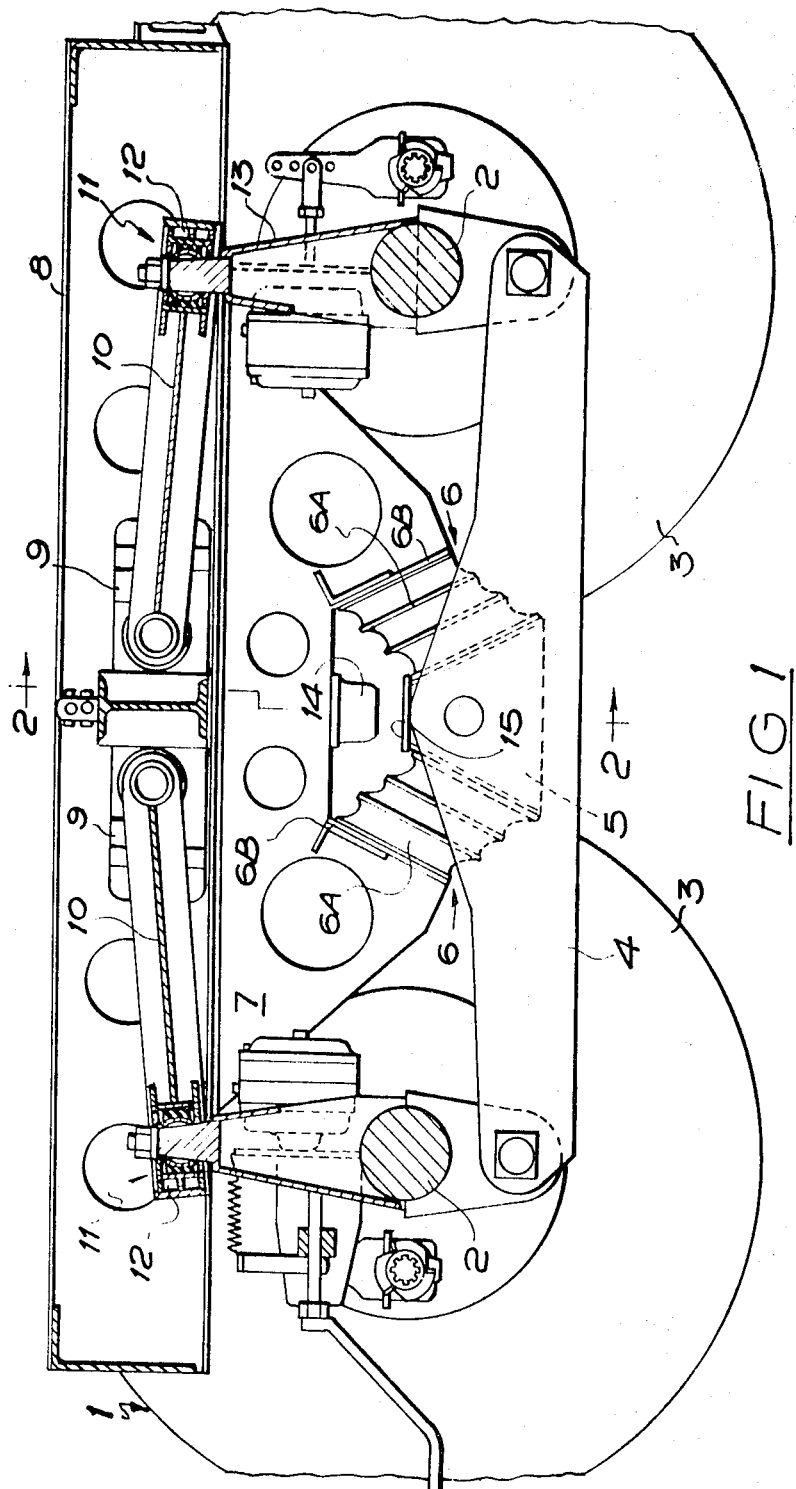

United States Patent

[11] 3,618,971

| | | | |
|---|---|---|---|
| [72] | Inventor | Ronald Wragg<br>Sheffield, England | |
| [21] | Appl. No. | 37,973 | |
| [22] | Filed | May 18, 1970 | |
| [45] | Patented | Nov. 9, 1971 | |
| [73] | Assignee | North Derbyshire Engineering Company<br>Limited | |
| [32] | Priority | May 22, 1969 | |
| [33] | | Great Britain | |
| [31] | | 26,061/69 | |

[54] SUSPENSION SYSTEMS FOR ROAD VEHICLES
5 Claims, 2 Drawing Figs.

[52] U.S. Cl. .................................................. 280/104.5,
267/57.1
[51] Int. Cl. .................................................. B60g 19/02

[50] Field of Search .......................................... 280/104.5;
267/21, 63, 57.1

[56] References Cited
UNITED STATES PATENTS
3,241,856  3/1966  Raidel .......................... 280/104.5
3,471,165  10/1969  Raidel .......................... 280/104.5

Primary Examiner—Philip Goodman
Attorney—Lowe and King

ABSTRACT: A road vehicle suspension system has a beam pivotally connected with an axle at each end and one or more rubber springs secured to a triangularly shaped block pivotally mounted on the beam, the rubber springs at their other ends being nonpivotally mounted on the frame of the vehicle, the pivot point between the rubber springs and the beam lying on or about the horizontal center plane through the metal plate secured to the pivotally secured block.

INVENTOR
RONALD WRAGG
BY
Lowe & King

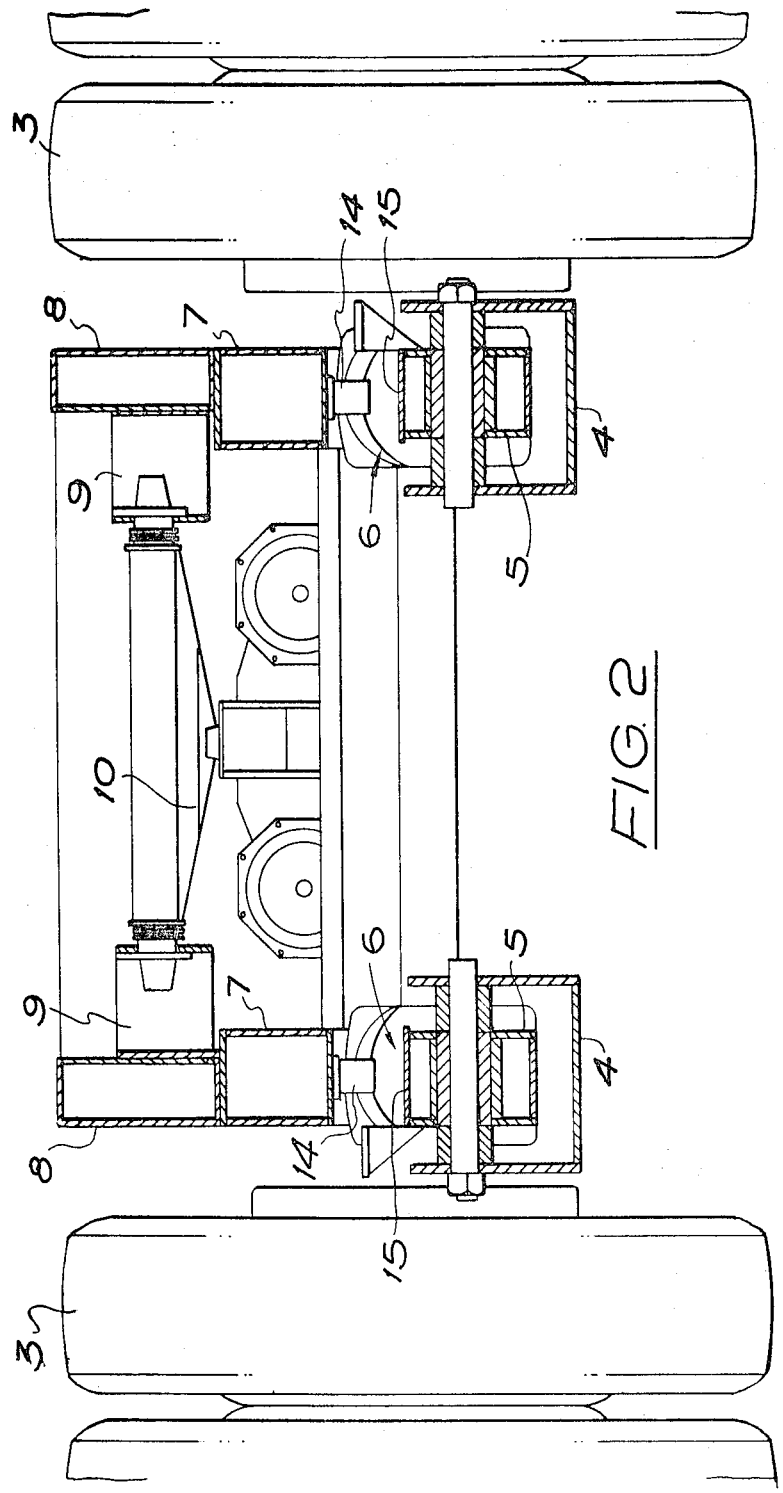

SUSPENSION SYSTEMS FOR ROAD VEHICLES

This invention relates to suspension systems for road vehicles, and is particularly, but not necessarily exclusively, related to suspension systems for vehicles designed for heavy loading.

It has been proposed to replace conventional suspension systems employing leaf springs which systems are heavy and relatively complex and costly, with a suspension system employing blocks of rubber or the like material having metal plates bonded to the ends of the blocks and serving to connect the blocks to the frame of the vehicle and to the axle (or axles in the case of a bogey or similar assembly).

It is the case that in such suspension systems, the rubber or the like blocks are mounted so that they are subjected to combined shear and compression under load, giving greater flexibility and therefore better traction, and it is important to the correct functioning of the system that there should be no restriction imposed on the ability of the blocks to be compressed by the vertical and longitudinal components of the load, for otherwise the system would not have the ability to resiliently support the loads for which the system has been designed.

The object of the present invention is to provide such, so called, rubber suspension systems with improved ability to withstand bending moments that can be set up in the rubber blocks under certain extreme conditions, for example when an unloaded vehicle is running empty and is braked violently.

According to the present invention a road vehicle suspension system has a beam pivotally connected with an axle at each end and one or more rubber springs are pivotally mounted on the beam and nonpivotally mounted on the frame of the vehicle, the rubber springs each comprising metal plates, separated by and bonded to blocks of rubber or the like material mounted between the frame and the beam, such that the rubber portions are subjected to combined shear and compression under load, the pivot point between the rubber springs and the beam lying on or about the horizontal center plane through the metal plate pivotally secured to the beam. As had hitherto been proposed the pivotal connection between the rubber spring and the beam, with the vehicle unloaded lay below the horizontal center plane through the plate at that end of the rubber spring so that when running empty, severe braking or rapid acceleration could produce horizontal forces acting on the bottom edge of the lower plate with the result that severe bending moments could be set up in the rubber blocks thus increasing the possibility of tearing of the rubber blocks. This condition in the suspension system does not arise when the vehicle is loaded because when loaded, the effective line of action of any braking or acceleration forces has been effectively raised by the lowering of the frame and the load so that the braking and acceleration forces are taken centrally by the plate secured to the beam and, accordingly, no or exceedingly small, bending moments are applied to the rubber blocks.

By arranging the pivot point of the rubber block to the beam to lie on or about the center plane through the plate on the rubber block secured to the beam, even when running empty, the braking forces and acceleration forces are taken centrally by that plate, and accordingly, the rubber blocks are not subjected to any bending moment at all, or are only subjected to such small bending moments that are well able to be resisted by the rubber blocks. When the vehicle is loaded, the effective line of action is raised above the center plane of the plate secured to the beam and any accelerating or braking forces in that plane do not subject the rubber blocks to bending moments.

One embodiment of the invention will now be described with reference to the accompanying drawings, in which:

FIG. 1 is a vertical section through a bogey comprised of two axles connected by two beams and embodying the suspension according to the invention; and FIG. 2 is a section on the line 2—2 of FIG. 1.

A bogey 1 has two axles 2 supporting wheels 3, the axles being connected by two beams 4 of channel section, one to each side of the bogey.

Centrally of each beam 2, there is a center box 5 pivotally secured within the channel section beam the center box having a rhomboidal section. Two rubber springs 6 formed by blocks 6a of rubber bonded to metal plates 6b are secured to the center box, one to each inclined side face, the other end of each rubber spring being connected to a similarly inclined face on a rubber spring mounting box 7 secured to and supporting a subframe 8. The subframe 8 has two torque arm brackets 9, one associated with the front wheels and the other with the rear wheels of the bogey. Torque arms 10 are connected to each bracket and are provided at their other ends with a housing 11 for a rubber bush 12 in which is secured a torque arm bracket axle 13 secured to each axle 2, to provide a balancing effect of the load applied should one wheel be lifted or lowered in respect to the other on each side of the bogey.

Each rubber spring-mounting box is provided with a rubber stop 14 adapted to abut a flat top face 15 to the center box to restrict the extent of movement of the beams towards the subframe.

In addition to the items referred to above, the bogey also includes all integers normally associated with bogies.

Each center box is pivotally secured to each beam such that the pivot point lies on or about the center plane through the bottom plate 6b of each rubber spring, when the vehicle (not shown) to which the bogey is applied is unladen. Thus when the vehicle experiences the extreme conditions as can occur when braking violently or when accelerating rapidly the line of action of such violent forces is in the horizontal center plane through the bottom plates and accordingly cannot impar to the rubber springs any violently applied bending moment which might otherwise be sufficient to rupture the rubber spring. When the vehicle is laden the effective line of action is raised above the center plane of the plate 6b secured to the center box and any violent force brought about by braking or accelerating cannot subject the rubber springs to bending moment. Therefore, it is impossible under all conditions for the rubber springs to be subjected to harmful bending moments.

What I claim is:

1. A road vehicle suspension system having a beam pivotally connected with an axle at each end and one or more rubber springs pivotally mounted on the beam and nonpivotally mounted on the frame of the vehicle, the rubber springs each comprising metal plates, separated by and bonded to blocks of rubber or the like material mounted between the frame and the beam, such that the rubber portions are subjected to combined shear and compression under load, the pivot point between the rubber springs and the beam lying on or about the horizontal center plane through a metal plate pivotally secured to the beam.

2. A road vehicle suspension system as in claim 1, wherein in a bogey comprised of two axles connected by two beams, there are provided two rubber springs for each beam, each rubber spring on each beam being inclined equally and oppositely in an upward direction from the beam.

3. A road vehicle suspension system as in claim 1, wherein the plate on the lower end of each spring is secured to a sloping face on a triangular-shaped block pivotally secured to the beam, and the upper plate nonpivotally secured to the frame of the vehicle.

4. A road vehicle suspension system as in claim 3, wherein the pivot between the triangular shaped block and the beam lies on or about the center plane through the bottom plates secured to the block, when the vehicle is in an unloaded state.

5. A road vehicle suspension system as in claim 3, wherein the triangular-shaped block has a flat top surface to be abutted by a projection extending downwardly from the frame of the vehicle to restrict the extent to which the frame can approach the beam.

* * * * *